United States Patent
Dubnack et al.

(10) Patent No.: US 6,907,179 B2
(45) Date of Patent: Jun. 14, 2005

(54) DEVICE FOR HOLDING OPTICAL COMPONENTS

(75) Inventors: Steffen Dubnack, Jena (DE); Dirk Preuss, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/116,181

(22) Filed: Apr. 3, 2002

(65) Prior Publication Data

US 2002/0181927 A1 Dec. 5, 2002

(30) Foreign Application Priority Data

Apr. 7, 2001 (DE) .......................................... 101 18 465

(51) Int. Cl.[7] .............................................. G02B 6/00
(52) U.S. Cl. ...................................... 385/137; 385/141
(58) Field of Search ................................ 385/136, 137, 385/123

(56) References Cited

U.S. PATENT DOCUMENTS

| | | | | | |
|---|---|---|---|---|---|
| 3,982,123 | A | * | 9/1976 | Goell et al. ............. | 250/227.24 |
| 3,996,067 | A | * | 12/1976 | Broder ....................... | 136/256 |
| 4,799,755 | A | * | 1/1989 | Jones ......................... | 385/38 |
| 4,919,513 | A | * | 4/1990 | Nakakuki et al. ........... | 385/127 |
| 5,204,930 | A | * | 4/1993 | Brandt et al. ............... | 385/143 |
| 5,790,742 | A | * | 8/1998 | Tsubaki et al. ............. | 385/144 |
| 6,540,389 | B1 | * | 4/2003 | Novak et al. ............... | 362/551 |
| 2003/0077057 | A1 | * | 4/2003 | Kato et al. .................. | 385/123 |

FOREIGN PATENT DOCUMENTS

| | | | |
|---|---|---|---|
| DE | 36 30 351 | 3/1987 | |
| DE | 40 07 218 | 9/1991 | |
| DE | 42 33 087 | 7/1994 | |
| DE | 38 54 841 | 5/1996 | |
| DE | 297 10 678 | 11/1997 | |
| DE | 198 19 246 | 4/1998 | |
| DE | 37 08 513 | 11/1998 | |
| EP | 1291691 A1 * | 3/2003 | ............ G02B/6/42 |
| JP | 54150139 A * | 11/1979 | ............ G02B/5/14 |
| JP | 60181712 A * | 9/1985 | ............ G02B/6/42 |
| JP | 63163404 A * | 7/1988 | ............ G02B/6/02 |
| JP | 07159819 A * | 6/1995 | ............ G02F/1/37 |
| JP | 2000266953 A * | 9/2000 | ............ G02B/6/20 |

OTHER PUBLICATIONS

Designers Guide to Fiber Optics, AMP Incorporated, 1982, pp. 22–25.*

* cited by examiner

*Primary Examiner*—Ellen E. Kim
(74) *Attorney, Agent, or Firm*—Reed Smith LLP

(57) ABSTRACT

An arrangement is disclosed for holding optical components, particularly light guides, and is characterized in that the parts of the holder contacting the optical component are made of a material with an index of refraction associated with the index of refraction of the material of optical component.

1 Claim, 2 Drawing Sheets

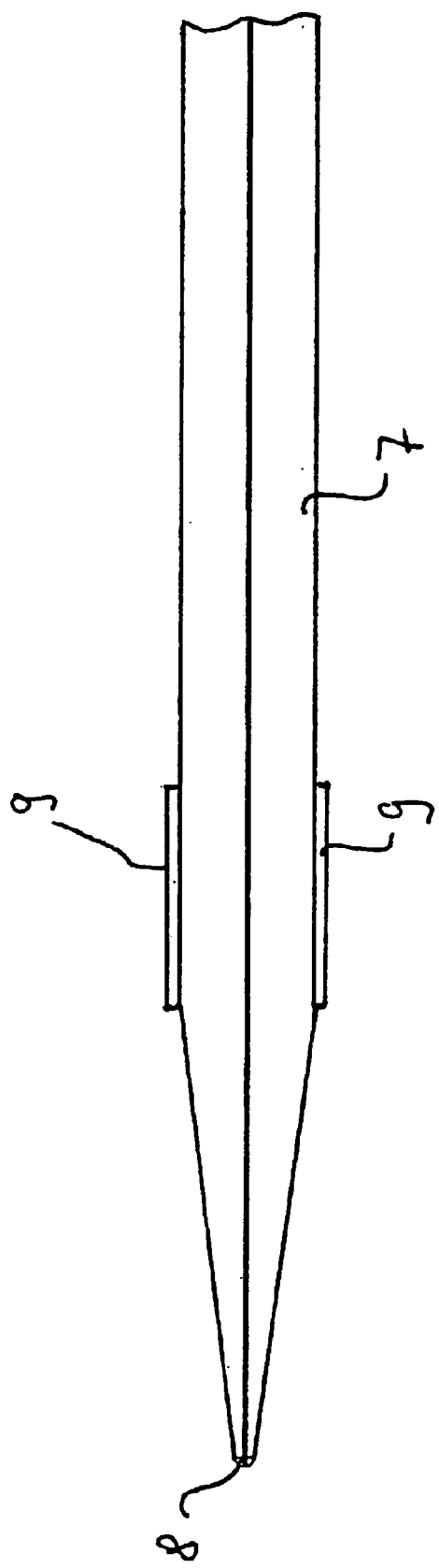

DEVICE FOR HOLDING OPTICAL COMPONENTS

CROSS-REFERENCE TO RELATED APPLICATIONS

This application claims priority of German Application No. 101 18 465, filed Apr. 7, 2001, the complete disclosure of which is hereby incorporated by reference.

BACKGROUND OF THE INVENTION a) Field of the Invention

The invention is directed to a device for holding optical components, particularly light guides, in which the light is guided at the outer surfaces of the light guides by total reflection. Light guides of this type are known in essentially two embodiment forms: as cylindrical light guides, e.g., light-conducting fibers, and as prismatic light guides, e.g., light mixing rods, as they are called, such as those used in modern digital projection.

b) Description of the Related Art

A light mixing rod of the type mentioned above is known, e.g., from German Patent DE 198 19 246. It comprises a polygonal or prismatic body which is totally reflecting at the lateral surfaces. This reference also describes the difficulty presented by holding such mixing rods due to the fact that contact with the holder can inhibit total reflection in some areas and can accordingly result in light losses. As a solution to this problem, the reference proposes that the holder be realized as a punctiform or line-shaped support in order to minimize losses. In particular, it is suggested that the holder be constructed from very thin sheet metal which contacts the mixing rod only by an edge. However, the stability of a holder of this type is in need of improvement. Further, it has been shown that contamination of the outer surfaces of the mixing rod cause considerable losses.

In light-conducting fibers with a homogeneous distribution of the refractive index, the same problems occur on principle. Gradient index fibers in which the total reflection occurs inside the fiber and not at its interfaces or boundary surfaces due to a special inhomogeneous refractive index curve were developed as a remedy. However, fibers of this kind are much more complicated to produce than fibers of homogeneous material.

OBJECT AND SUMMARY OF THE INVENTION

Therefore, it is the primary object of the invention to overcome the disadvantages of the prior art and to provide a simple type of holder for the light guides described above.

By light guides is also meant optical waveguides which are suitable for components of the spectrum other than the visible components.

According to the invention, this object is met by a device for holding optical components, particularly light guides which guide the light at the outer surfaces by total reflection, in that the holder at least partially comprises a material with an optical index of refraction which is smaller than the index of refraction of the material of the light guide.

It is important that the parts of the holder contacting the light guide comprise a material with an optical index of refraction that is smaller than the index of refraction of the material of the light guide.

The optical index of refraction of the part of the holder contacting the light guide is advantageously smaller than $$\sqrt{n_{11}^2 - \sin^2 \alpha} \tag{1}$$

where $n_{11}$ is the optical index of refraction of the material of the light guide and a is the maximum incident angle of the in-coupling of light into the light guide and/or the provided maximum exit angle from the light guide with respect to air. Therefore, all of the light radiated into the light guide at an angle smaller than $\alpha$ is conducted further in the light guide.

The parts of the holder contacting the light guide can comprise transparent silicon, transparent PTFE or transparent FEP.

In a particularly advantageous solution, the part of the holder contacting the light guide comprises heat-shrinkable material. In this connection, it is advantageous when the shrinkable material is allowed to preferably completely enclose the lateral surfaces of the light guide. At the same time, this construction of the invention solves the problem that contamination such as dirt particles or the like located on the light guide can severely interfere with the total reflection, since the light guide itself is protected from contamination by the shrinkable material.

The invention will be described more fully in the following with reference to the drawings and with respect to two preferred embodiment examples.

BRIEF DESCRIPTION OF THE DRAWINGS

In the drawings:

FIG. 3 is a drawing of a light-conducting tubular probe in accordance with the invention.

DESCRIPTION OF THE PREFERRED EMBODIMENTS

Figure 1:
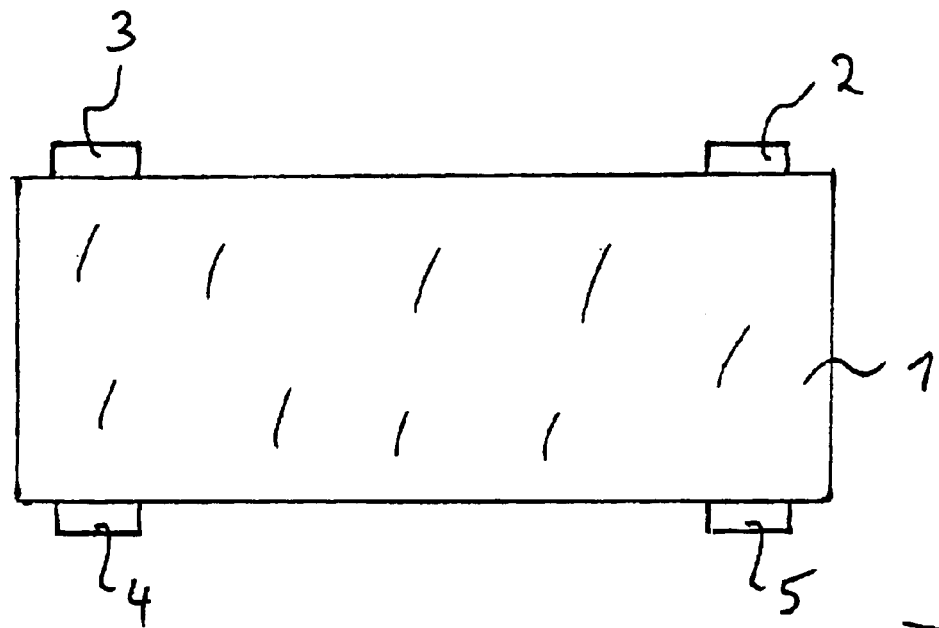
FIG. 1 shows a mixing rod for a digital projector in accordance with the prior art.

FIG. 1 shows a light mixing rod for a digital projector such as that known, e.g., from German Patent DE 198 19 246. In principle, the light mixing rod comprises a plane-parallel plate 1 which is made of a glass with a high index of refraction (e.g., BK7 with an optical index of refraction of around 1.52). The rod is held, for example, by four small blocks 2, 3, 4, 5 which are connected to the housing in a manner not shown. In order to realize a maximum incident angle of 30°, for example, the maximum index of refraction for the material of the small blocks is given by formula (1):

$$n_{max} = 1.435.$$

Accordingly, the following materials, in addition to many others, are suitable:

PTFE (Zeus Industrial Products, Orangeburg, S.C., USA): n=1.35;

FEP (Zeus Industrial Products): n=1.338;

Silicon glue MED-6033 (NuSil Technology, Carpinteria, Calif. 93013, USA): n=1.41.

Figure 2:
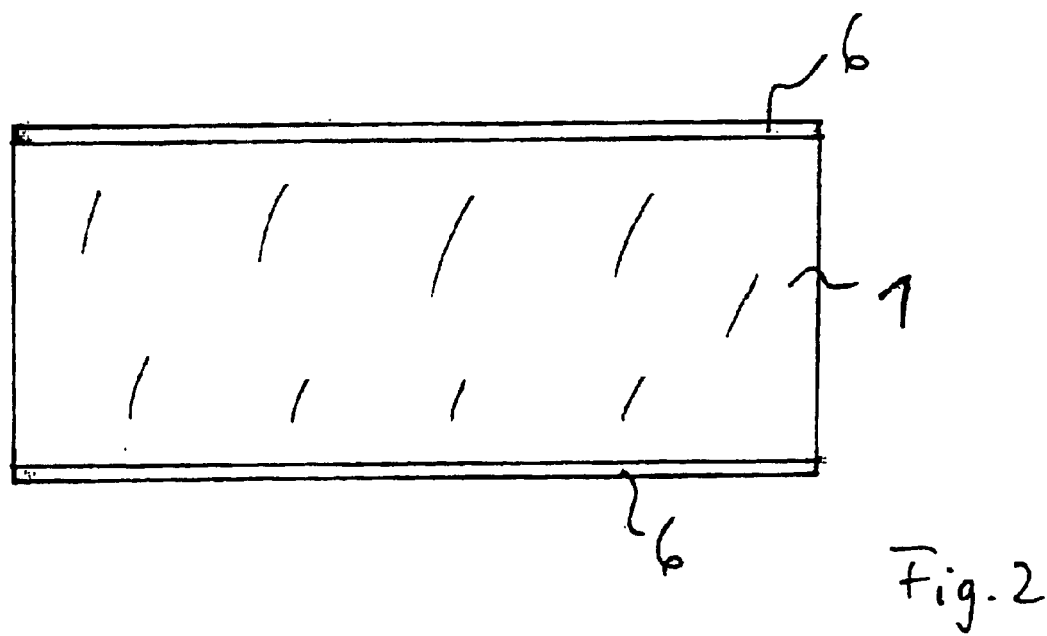
FIG. 2 is a view, in section, of a light mixing rod whose jacket surfaces are entirely enclosed by a shrink tube.

FIG. 2 is another view, in section, of a light mixing rod 1 whose jacket surfaces are entirely enclosed by a shrink tube 6. Due to this complete covering of the lateral surfaces of the rod, total reflection can not be disturbed subsequently by contamination.

FIG. 3 shows an embodiment example for a light-conducting tubular probe. The light guide 7, shown in section, ends in a tapered tip 8. For purposes of holding the light guide, it is partially enclosed by a shrink tube 9 of a material with a suitable index of refraction (calculated according to formula (1)). This shrink tube 9 can also be pulled along the entire jacket surface of the light guide 7 to protect against contamination.

The realization of the invention is not limited to the embodiment examples shown herein. In particular, other materials which advantageously meet the condition of formula (1) can also be suitable for the holder.

While the foregoing description and drawings represent the present invention, it will be obvious to those skilled in the art that various changes may be made therein without departing from the true spirit and scope of the present invention.

What is claimed is:

1. A device for holding an optical component, particularly a light guide which guides the light at the outer surfaces by total reflection, comprising a material with an optical index of refraction which is smaller than the index of refraction of the light guide, the device holding the light guide at discrete portions of the light guide;

wherein the optical index of refraction of the part of the device contacting the light guide is smaller than $$\sqrt{n_u^2 - \sin^2\alpha}$$

where $n_{11}$ is the optical index of refraction of the light guide and $\alpha$ is the maximum incident angle of the in-coupling of light into the light guide and/or the provided maximum exit angle from the light guide with respect to air, and wherein the part of the device contacting the light guide comprises heat-shrinkable material.

* * * * *